United States Patent
Arafat (10) Patent No.: US 10,966,807 B1
(45) Date of Patent: Apr. 6, 2021

(54) ELECTRIC TOOTHBRUSHES

(71) Applicant: Salina Arafat, Chicago, IL (US)

(72) Inventor: Salina Arafat, Chicago, IL (US)

( * ) Notice: Subject to any disclaimer, the term of this patent is extended or adjusted under 35 U.S.C. 154(b) by 125 days.

(21) Appl. No.: 16/013,521

(22) Filed: Jun. 20, 2018

Related U.S. Application Data (60) Provisional application No. 62/522,198, filed on Jun. 20, 2017.

(51) Int. Cl.
| | |
|---|---|
| *A61C 17/34* | (2006.01) |
| *A46B 5/04* | (2006.01) |
| *A46B 5/02* | (2006.01) |
| *A46B 13/02* | (2006.01) |
| *A61C 17/22* | (2006.01) |

(52) U.S. Cl.
CPC ............ *A61C 17/3481* (2013.01); *A46B 5/02* (2013.01); *A46B 5/04* (2013.01); *A46B 13/023* (2013.01); *A61C 17/225* (2013.01); *A61C 2204/002* (2013.01)

(58) Field of Classification Search
CPC ........... A46B 5/02; A46B 5/021; A46B 5/023; A46B 5/025; A46B 5/04; A46B 13/023; A61H 13/00; A61H 7/005; A61H 23/02; A61H 23/0263; A61H 23/254; A61C 17/225; A61C 17/3481
USPC ............... 15/22.1; 601/72–74, 142
See application file for complete search history.

(56) References Cited

U.S. PATENT DOCUMENTS

| | | | |
|---|---|---|---|
| 1,645,965 A | * | 10/1927 | Neumerkel ............. A46B 5/04 15/227 |
| 1,894,413 A | | 1/1933 | Nenning |
| 3,358,309 A | | 12/1967 | Richardson |
| 3,623,481 A | | 11/1971 | Curran |
| 3,842,851 A | | 10/1974 | Pipitone |
| 4,134,172 A | | 1/1979 | Arce |
| 4,617,694 A | | 10/1986 | Bori |
| 4,628,949 A | | 12/1986 | Mas |
| 4,679,274 A | | 7/1987 | Friedman |
| 5,765,252 A | | 6/1998 | Carr |
| 5,826,599 A | | 10/1998 | Adams |
| 5,875,513 A | | 3/1999 | Reinold |
| 5,953,783 A | | 9/1999 | Hahn |
| 6,016,812 A | | 1/2000 | Guynn |
| D430,677 S | | 9/2000 | Robinson |
| 6,203,509 B1 | | 3/2001 | Duboff |

(Continued)

FOREIGN PATENT DOCUMENTS

| | | | |
|---|---|---|---|
| DE | 102013011387 | * | 12/2014 |
| FR | 2668346 | * | 4/1992 |

(Continued)

OTHER PUBLICATIONS

Partial machine translation of WO 2005/007014, Jan. 27, 2005 (Year: 2005).*

(Continued)

*Primary Examiner* — Mark Spisich
(74) *Attorney, Agent, or Firm* — Ice Miller LLP (57) ABSTRACT

An electric toothbrush disclosed herein includes a vibrator having a housing and a motor. The housing encloses the motor and a portion of a switch operably coupled to the motor. The electric toothbrush also includes a head portion including a brush. A cap is coupled to the head portion. The head portion and the end cap enclose the vibrator.

18 Claims, 5 Drawing Sheets

(56) References Cited

U.S. PATENT DOCUMENTS

| | | | |
|---|---|---|---|
| 6,237,178 B1* | 5/2001 | Krammer | A46B 9/026 15/22.1 |
| 6,283,930 B1 | 9/2001 | Purvis et al. | |
| 6,434,773 B1 | 8/2002 | Kuo | |
| 6,647,549 B2 | 11/2003 | McDevitt et al. | |
| D605,406 S | 12/2009 | Wagner | |
| 7,845,039 B2 | 12/2010 | Chan et al. | |
| 7,913,344 B2 | 3/2011 | Takahashi | |
| 7,954,196 B1 | 6/2011 | Nault-Richter | |
| 8,327,858 B2 | 12/2012 | Neuner et al. | |
| 8,793,829 B2* | 8/2014 | Shimoyama | A46B 13/023 15/22.1 |
| 9,320,348 B2 | 4/2016 | Sabet | |
| 2001/0025644 A1 | 10/2001 | Tsuji et al. | |
| 2006/0090274 A1* | 5/2006 | Kim | A61C 17/16 15/22.1 |
| 2008/0087296 A1 | 4/2008 | Gueret | |
| 2012/0137454 A1* | 6/2012 | Huy | A46B 15/0008 15/22.1 |
| 2012/0233789 A1* | 9/2012 | Kitagawa | A61C 17/225 15/22.1 |
| 2014/0096332 A1* | 4/2014 | Kitagawa | A46B 15/0036 15/22.1 |
| 2015/0113747 A1* | 4/2015 | May | A46B 15/0004 15/22.1 |
| 2016/0135582 A1 | 5/2016 | Yen | |
| 2017/0056145 A1 | 3/2017 | Sedic | |

FOREIGN PATENT DOCUMENTS

| | | | |
|---|---|---|---|
| JP | 2012-90660 | * | 5/2012 |
| WO | 2005/007014 | * | 1/2005 |

OTHER PUBLICATIONS

Oskay, Windell; Bristlebot: A tiny directional vibrobot; Evil Mad Scientist; Retrieved from: http://www.evilmadscientist.com/2007/bristlebot-a-tiny-directional-vibrobot/; Dec. 19, 2007.

Yosoo 2 pcs Soft Finger Toothbrush Pet Oral Dental Cleaning Teeth Care Hygiene Brush, random; www.webcortex.com; Retrieved from: http://www.webcortex.com/product_detail.php?id=SKUB017GX0CQ0&search_param=+Pet+Supplies+%3E+Pet+Oral+Care+%3E+Pet+Toothbrushes&item_name=Yosoo+2+Pcs+Soft+Finger+Toothbrush+Pet+Oral+Dental+Cleaning+Teeth+Care+Hygiene+Brush&r=.

Sentry Petrodex Delux Finger Toothbrush for Dogs and Cats, 2 count; www.amazon.com; Retrieved from: https://www.amazon.com/SENTRY-Petrodex-Delux-Finger-Toothbrush/dp/B008X6YDWE; Aug. 21, 2017.

* cited by examiner

ELECTRIC TOOTHBRUSHES

RELATED APPLICATION DATA

This application claims the priority benefit of U.S. Provisional Application No. 62/522,198, filed Jun. 20, 2017, which is hereby incorporated in its entirety herein by reference.

BACKGROUND

Conventional electric toothbrushes are large devices for use in a person's home. These conventional electric toothbrushes generally include large motors and/or batteries that require frequent recharging, often through a recharging base station plugged into a wall socket.

BRIEF DESCRIPTION OF THE DRAWINGS

The examples and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

Figure 1:
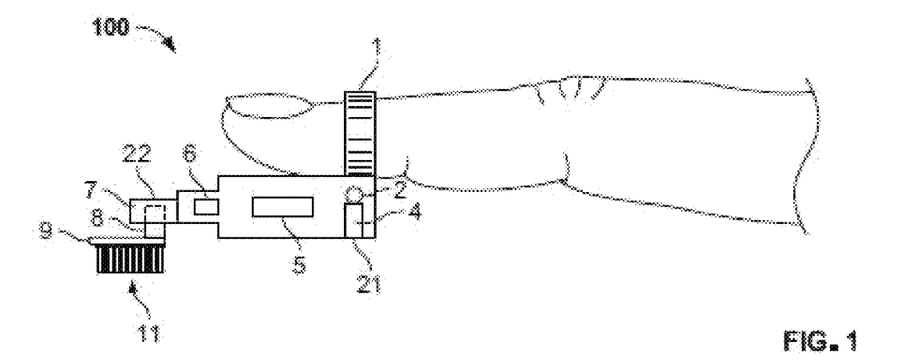
FIG. 1 is a perspective view of an example electric toothbrush in accordance with the teachings of the present disclosure.

FIG. 1 illustrates an example electric toothbrush 100 disclosed herein. The electric toothbrush 100 includes a finger coupling 1 (e.g., a finger receptacle). In some examples, the finger coupling 1 includes one or more flexible and/or elastically deformable structures such as one or more straps and/or a ring. For example, the finger coupling 1 may be any material and/or structure suitable to secure the electric toothbrush 100 to a user's finger including, but not limited to, an adjustable strap or an elastic ring that expands and/or contracts to fit various finger sizes. The finger coupling 1 may be materials such as silicon or rubber.

In some examples in which the finger coupling 1 is an adjustable strap, the finger coupling 1 may include a two strap system wherein one strap has a male piece that fits into a female piece on the second strap, a two strap system wherein the two straps have hook and loop fasteners such as Velcro, or a one strap system that wraps around the user's finger and fastens to itself. In some examples, the finger coupling 1 may include a glove piece that covers the finger while using the electric toothbrush 100.

The electric toothbrush 100 further includes a housing unit 2 having a first end 21 and a second end 22. The first end 21 may be coupled to the finger coupling 1 by any suitable means, including, but not limited to, permanent and removable couplings. A removable coupling allows a user to replace a worn or dirty finger coupling without having to replace the entire housing unit 2. The second end 22 of the housing unit 2 may extend beyond the end of a user's fingertip, allowing a user to reach teeth in the rear portion of the user's mouth without having to insert the user's finger and/or portions of the user's finger into the user's mouth. In some examples, the second end 22 of the housing unit 2 may extend from 0.25 inches to 1.5 inches beyond the end of a user's fingertip. Further, the housing unit 2 may be constructed as a single piece or as a plurality of pieces. In some examples wherein the housing unit 2 is constructed as a plurality of pieces, the housing unit 2 is openable such that the components therein may be replaced. In some examples wherein the housing unit 2 is constructed as a single piece, the housing unit 2 is not openable. Ideally, the housing unit 2 is either entirely waterproof, or substantially waterproof such that electrical components remain dry when the housing unit 2 is used during regular teeth brushing activities, regardless of whether the single piece or plurality of pieces construction is utilized.

The housing unit 2 may further include a plurality of components. These components may be located within the housing unit 2 and/or on the exterior of the housing unit 2. In the illustrated example, the housing unit 2 includes a battery 4. In some examples, the battery 4 is located within the housing unit 2. Further, the battery 4 may be rechargeable or a one-time use battery. In some examples where the battery 4 is rechargeable, the battery 4 may be removable from the housing unit 2 to enable the battery 4 to be recharged, or the housing unit 2 may couple to a charging source that charges the battery. The battery 4 may include a button cell battery or any other battery of a suitable size to fit into the housing unit 2.

In some examples, the housing unit 2 may include a motor 6. The motor 6 may be a vibrating motor such as an eccentric rotating mass vibration motor (ERM) or a linear resonant actuator (LRA). In some examples, the motor 6 is operably coupled to the battery 4 and is located within the housing unit 2. Further, the motor 6 may be located in the housing unit 2 in a location such that a majority of the vibrational force created by the motor 6 is transferred to the second end 22 of the housing unit 2.

In some examples, the housing unit 2 may include a switch 5. In the illustrated example, the switch 5 is operably coupled to the battery 4 and/or the motor 6 such that the switch 5 controls the on/off operation of the motor 6. The switch 5 is accessible to the user on the outside of the housing unit 2. The switch 5 may include a mechanical switch that physically completes a circuit operably coupled to the motor 6, the switch 5, and/or the battery 4, and/or the switch may be electric such that it sends an electric signal that turns the circuit comprising the motor 6, switch 5, and battery 4, on or off. Additionally, there may be an automatic off function that automatically turns of the circuit comprising the motor 6, the switch 5, and the battery 4, after a given amount of time.

The second end 22 of the housing unit 2 may include a cap portion 7. The cap portion 7 is coupled to a head portion 11. The head portion 11 may be removably coupled to the cap portion 7 to enable a user to replace the head portion 11 periodically without having to replace the entire housing unit 2. The head portion 11 may be removably coupled to the cap portion 7 by, including but not limited to, threading located on each of the head portion 11 and cap portion 7, by a combination of female and male portions on the head portion 11 and the cap portion 7, respectively, and/or any other suitable removable coupling. The head portion 11 may also be permanently couple to the cap portion 7 such that replacement of the head portion 11 requires replacement of the entire housing unit 2.

The head portion 11 may include a neck portion 8 and a brush head 9. The neck portion 8 couples to the cap portion 7. The brush head 9 includes toothbrush elements such as nylon brushes or bristles. Additionally the brush head 9 may be reusable or disposable. In some examples in which the brush head 9 is disposable, the brush head 9 may include toothpaste or other teeth cleaning substances that are activated when pressed against the tooth, when in contact with saliva, and/or when in contact with water from, for example, a faucet to enable a user to use the electric toothbrush 100 while on the go when a bathroom may not be available. The head portion 11 may also be scented and/or coated in a material that provides a pleasant taste to a user brushing his teeth, such as mint, cinnamon, and/or other flavors.

When the head portion 11 is coupled to the cap portion 7, the vibrational force created by the motor 6 is transferred through the housing unit 2 to the head portion 11 and further to the brush head 9, resulting in a brush head 9 that, in some examples, generates more brush strokes per minute than a manual toothbrush. The number of brush strokes per minute generated by the electric toothbrush 100 can be increased by using a motor 6 that produces a higher number of revolutions per minute.

The electric toothbrush 100 of FIG. 1 is compact such that a user can keep it on his or her person, for example, in a purse or pocket.

Figure 2:
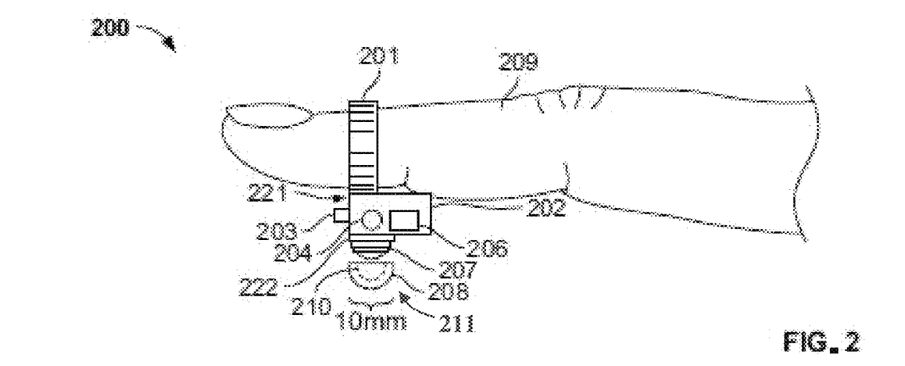
FIG. 2 is a perspective view of another electric toothbrush in accordance with the teachings of the present disclosure.
Figure 3:
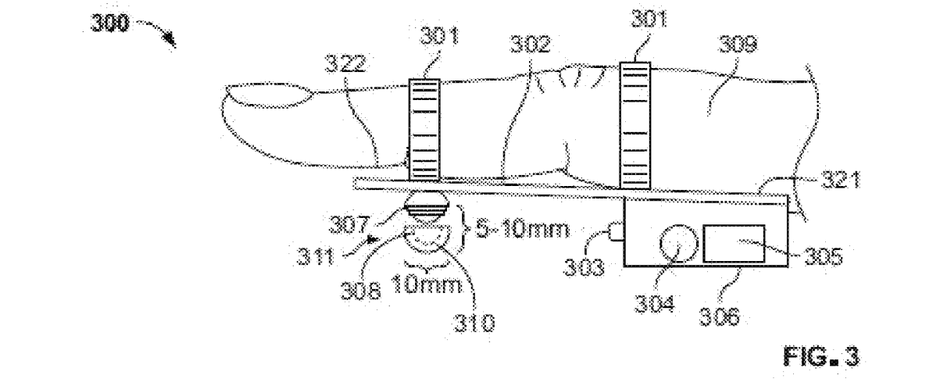
FIG. 3 is a perspective view of another example electric toothbrush in accordance with the teachings of the present disclosure.

The electric toothbrushes of FIGS. 2 and 3 are configured to not extend beyond the tip of the finger (e.g., the electric tooth brushes of FIGS. 2 and 3 are disposed between a proximal end and a distal end of the finger). In some examples, the tooth brushes of FIGS. 2 and 3 include substantially the same components as the tooth brush 100 of FIG. 1, and/or the components of the tooth brushes of FIGS. 2 and 3 perform the same or similar functions as the components of the tooth brush 100 of FIG. 1, but the components of the tooth brushes of FIGS. 2 and 3 are positioned and/or arranged in different manners than the components of the tooth brush 100 of FIG. 1.

FIG. 2 illustrates an example where the electric toothbrush 200 extends substantially perpendicular to the finger 209. A housing unit 202 does not extend beyond the tip of the finger. Rather, the housing unit 202 is disposed between a proximal end and a distal end of the finger and extends perpendicularly to the finger when the finger is substantially straight. A first end 221 of the housing unit 202 may couple to a finger coupling 201, and the finger coupling 201 may secure the electric toothbrush 200 to the finger. For example, the finger coupling 201 may be any material and/or structure suitable to secure the electric toothbrush 200 to a user's finger including, but not limited to, an adjustable strap or an elastic ring that expands and contracts to fit various finger sizes. In some examples, the finger coupling 201 is one or more materials such as silicon and/or rubber. The adjustable strap may include a two strap system wherein one strap has a male piece that fits into a female piece on the second strap, a two strap system wherein the two straps have hook and loop fasteners such as Velcro, or a one strap system that wraps around the user's finger and fastens to itself. In some examples, the finger coupling 201 may include a glove piece that covers the finger while using the electric toothbrush 200. In some examples, the housing unit 202 includes a switch 203, a battery 204, and a motor 206. The switch 203 may be operably coupled to the battery 204 and/or the motor 206 to control the on/off operation of the motor 206. Further, the second end 222 of the housing unit 202 includes a cap portion 207. The cap portion 207 couples to a head portion 211 in a manner similar or identical to cap portion 7 of the example illustrated in FIG. 1. The head portion 211 may further include a brush head 208 and a neck portion 210. The neck portion 210 may couple to the cap portion 207, and the brush head 208 includes the brushing surface to be pressed against a user's teeth.

The electric toothbrush 200 is sized and dimensioned to fit into a user's mouth when disposed on the user's finger. In some examples, the height of the electric toothbrush 200, measured from the first end 221 of the housing unit 202 to the tip of the brush head 208 is about 0.4 inches to about 1.5 inches. In some examples, the height of the electric toothbrush 200, measured from the first end 221 of the housing unit 202 to the tip of the brush head 208 is about 0.75 inches to about 1.0 inch. In some examples, the width of the electric toothbrush 200, measured as the width of the housing unit 202, is about 0.2 inches to about 0.7 inches. In some examples, the width of the electric toothbrush 200, measured as the width of the housing unit 202, is about 0.4 inches.

FIG. 3 illustrates another example electric toothbrush 300 disclosed herein. The electric toothbrush 300 is sized and dimensioned to fit into a user's mouth when disposed on a user's finger. In some examples, the height of the electric toothbrush 300 is shorter than the height of electric toothbrush 200 depicted in FIG. 2. Electric toothbrush 300 may include a finger coupling 301 that secures a first housing unit 302 to a finger 309. First housing unit 302 has a first end 321 and a second end 322. The first end 321 is coupled to a second housing unit 306. The second housing unit 306 includes a battery 304, an electric motor 305, and a switch 303. The switch 303 is operably coupled to the battery 304 and/or the electric motor 305 to enable the switch 303 to control the on/off operation of the motor 305. The second end 322 of the first housing unit 302 is coupled to a cap portion 307. The cap portion 307 may couple to a head portion 311 that comprises a neck portion 310 and a brush head 308. The neck portion 310 couples to the cap portion 307, for example, by friction fit, threading, or other removable couplings. For the electric toothbrush 300 illustrated in FIG. 3, the vibrational force created by the motor 305 is transferred from the second housing unit 306, through the first housing unit 302, to the cap portion 307, to the head portion 311, and ultimately to the brush head 308.

By arranging the second housing unit 306 and the cap portion 307 along the first housing unit 302, which is substantially parallel to the finger when the finger is substantially straight, and thus, by not arranging the various components of the electric toothbrush 300 to be stacked vertically upon each other, as in electric toothbrush 200, the height of the electric toothbrush 300 may be reduced and/or minimized. In some examples, the height of the electric toothbrush 300, measured from the upper side of the first housing unit 302 to the bottommost portion of the brush head 308 or the bottommost portion of the second housing unit 306 may be about 0.15 inches to about 0.6 inches. In some examples, the height of the electric toothbrush 300 is from about 0.2 inches to about 0.4 inches.

Figure 4A:
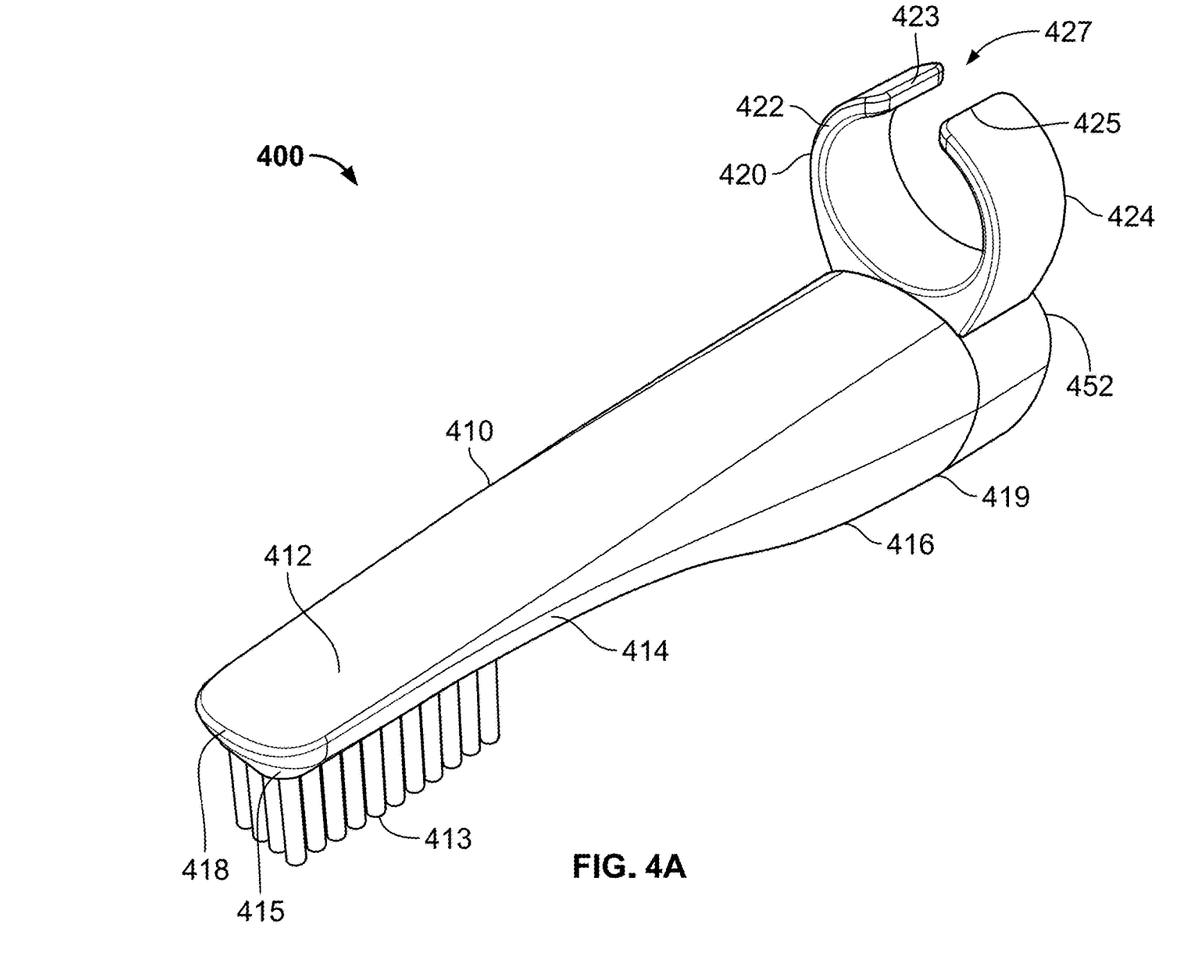
FIG. 4A is a perspective view of another electric toothbrush in accordance with the teachings of the present disclosure.
Figure 4B:
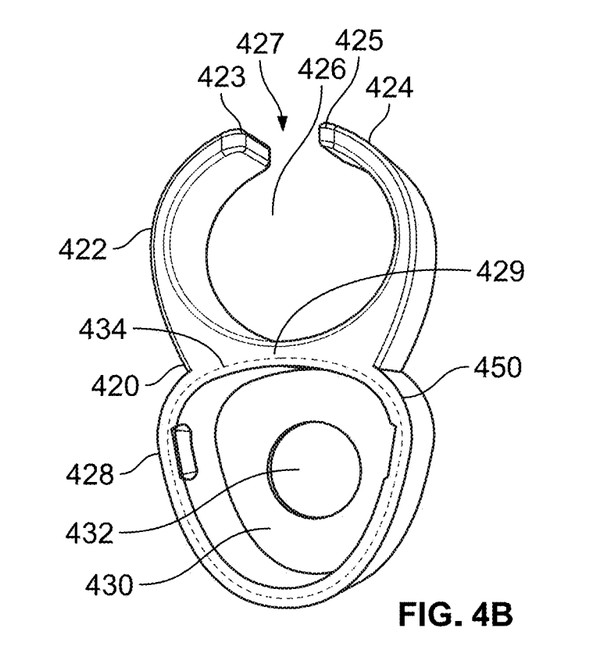
FIG. 4B is an elevation view of an example cap and finger receptacle of the electric toothbrush depicted in FIG. 4A.
Figure 4C:
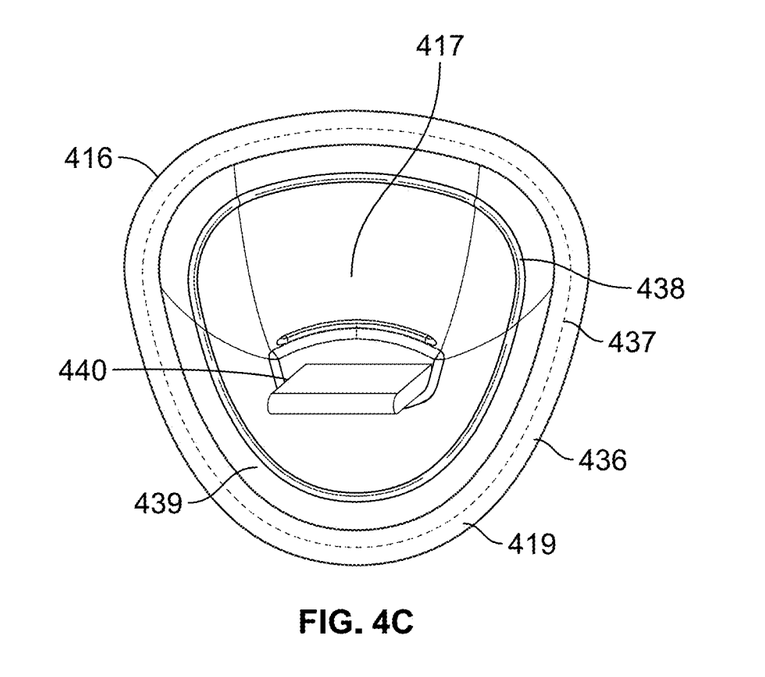
FIG. 4C is an end view of an example head portion of the electric toothbrush depicted in FIG. 4A.

Referring now to FIGS. 4A-C, another example of an electric toothbrush 400 is depicted in accordance with the teachings of this disclosure. FIG. 4A illustrates a perspective view of another the electric toothbrush 400. The electric toothbrush 400 in this example includes a head portion 410 and a finger receptacle 420. The finger receptacle 420 is sized and/or dimensioned to fit onto a user's finger (not shown) and/or receive the user's finger. In the illustrated example, the finger receptacle 420 is a clasp including a first prong 422 and a second prong 424. In some examples, the first prong 422 and the second prong 424 are curved and/or bent to define an opening 426 (e.g., a circular opening, an elliptical opening, and/or an opening of other shapes) between the first prong 422 and the second prong 424 through which a user's finger is to be received. In some examples, the first and second prongs 422, 424 do not fully encircle the opening 426, that is, a first tip 423 of the first prong 422 is spaced apart from a second tip 425 of the second prong 424 (e.g., the first tip 423 and the second tip 425 do not meet at a top 427 of the opening 426).

In the illustrated example, the prongs 422, 424 are a flexible and/or elastically deformable material to enable the prongs 422, 424 bend but return to their original position when a user inserts his finger into the opening 426 and/or removes his finger from the opening 426. For example, the first prong 422 may bend and/or elastically deform away from the second prong 424 and/or the second prong 424 may bend and/or elastically deform away from the first prong 422 (e.g., enlarging the opening 426) to fit over larger portions of a user's finger but return to their original position when at the smaller portion of the user's finger (e.g., on the distal, middle, or proximal phalanges). In other examples, the tips 423, 425 of the prongs 422, 424 are in contact. In some examples, the finger receptacle 420 includes a ring that fully encircles the opening 426 and may be a hard material making the ring rigid and sized and/or dimensioned to fit a specific finger size or a flexible and/or elastically deformable material to conform to a size of a finger.

In some examples, the finger receptacle 420 includes one or more flexible and/or elastically deformable structures such as one or more straps and/or a ring. For example, the finger receptacle 420 may be any material and/or structure suitable to secure the electric toothbrush 400 to a user's finger including, but not limited to, an adjustable strap or an elastic ring that expands and/or contracts to fit various finger sizes. The finger receptacle 420 may be materials such as silicon or rubber. In some examples in which the finger receptacle 420 is an adjustable strap, the finger receptacle 420 may include a two strap system wherein one strap has a male piece that fits into a female piece on the second strap, a two strap system wherein the two straps have hook and loop fasteners such as Velcro, or a one strap system that wraps around the user's finger and fastens to itself. In some examples, the finger receptacle 420 may include a glove piece that covers the finger while using the electric toothbrush 400.

The head portion 410 includes a brush head 412, a neck 414, and a base 416. The brush head 412 includes a first or distal end 418 of the head portion 410. In the illustrated example, the brush head 412 includes a brush of bristles 413. In some examples, the brush of bristles 413 is received by a bristle base 415, which can be made of plastic. In some examples, the bristle base 415 is removably coupled to the brush head 412 to enable a user to replace the brush of bristles 413 without replacing other portions of the tooth brush 400 such as the neck 414 and/or the base 416 of the head portion 410. In other examples, the bristle base 415 is non-removably coupled to the brush head 412. In some such examples, a user can replace the brush of bristles 413 by replacing the head portion 410. In some examples, the brush of bristles 413 are directly received by the brush head 412. In some such examples, the bristle base 415 would not be present. In other examples, the brush head 412 and/or the brush of bristles 413 are configured in other ways to facilitate brushing teeth. The base 416 extends from the neck 414 to a second end 419 of the head portion 410. Thus, the neck 414 is disposed between the brush head 412 and the base 416. The neck 414 is an extension that enables the brush head 412 to be sufficiently spaced apart from the finger receptacle 420 to enable a user to reach teeth in a rear of a mouth of the user when the user brushes his teeth with the tooth brush 400 of FIG. 4A. In some examples, some or all of the neck 414 is a substantially solid structure (e.g., the neck 414 is not hollow). In other examples, some or all of the neck 414 includes a cavity and/or is hollow.

The base 416 includes a first cavity 417 (FIG. 4C) and, thus is hollow to enable other components (described in further detail below) of the electric toothbrush 400 to be received in the base 416. In some examples, the first cavity 417 may extend into the neck 414 (e.g., the neck 414 and the base 416 cooperate to define the first cavity 417). In some examples, the brush head 412, the neck 414, and the base 416 of the head portion 410 defines the first cavity 417. In some such examples, the components received by the base 416 may extend into the neck 414 and/or the brush head 412 or portions of the first cavity 417 defined by the neck 414 and/or the brush head 412 may be empty.

In some examples, the head portion 410 has a length, measured from the first end 418 to the second end 419, of 1 inch to 5 inches. In other examples, the head portion 410 is 2 inches to 4 inches long. In some examples, the head portion 410 is 2 inches to 3.5 inches long. In some examples, the head portion 410 is 3 inches long. However, the above-noted lengths are merely examples and, thus, other lengths may be used without departing from the scope of this disclosure. In some examples, the length of the head portion 410 enables the brush head 412 to extend beyond a tip of a user's finger when the finger receptacle 420 is coupled to the finger, enabling the electric toothbrush 400 to reach teeth in the rear part of the mouth without having to extend the entire finger in the mouth.

FIG. 4B illustrates the finger receptacle 420 and a cap 428 of the electric toothbrush 400. In the illustrated example, the cap 428 is an end cap. In other examples, the electric toothbrush 400 may employ other types of closures that, as described in greater detail below, enclose some or all components the vibrator 510 (FIG. 5A) of the electric toothbrush 400. In the illustrated example, the finger receptacle 420 of is disposed on and/or extends from the end cap 428. In other examples, the finger receptacle 420 is disposed on and/or extends from other portions of the electric toothbrush 400 such as, for example, the neck 414 and/or the base 416 of the head portion 410 (FIG. 4A). In the illustrated example, the end cap 428 includes a first face 450 and a second face 452 (FIG. 4A). The first face 450 faces toward the head portion 410 when the end cap 428 is coupled to the head portion 410. In some examples, the first face 450 abuts the second end 419 of the head portion 410 (FIG. 4A) when the end cap 428 is coupled to the head portion 410. The end cap 428 is hollow. In the illustrated example, the end cap 428 includes a second cavity 430. The first face 450 defines a first mouth 434 of the second cavity 430. The end cap 428 includes an aperture 432 extending through the second face 452 and into the second cavity 430. The second cavity 430 is sized and shaped such that other components (described in further detail below) of the electric toothbrush 400 can be received in the cavity 430. The first and second prongs 422, 424 are disposed on the top 429 of the end cap 428 (e.g., on a side opposite the brush of bristles 413).

FIG. 4C illustrates the first cavity 417 of the head portion 410. The base 416 of the head portion 410 includes an interior surface 439 that defines the first cavity 417. The interior surface 439 includes a notch 438. The notch 438 is an indent in the interior surface 439 that extends circumferentially around the interior surface 439. In some examples, the notch 438 extends entirely around the interior surface 439. In other examples, the notch 438 extends around a portion of the interior surface 439. The base 416 includes a third face 436 located at the second end 419 of the base 416. The third face 436 defines a second mouth 437 of the first cavity 417. In the illustrated example, the first mouth 434 of the end cap 428 and the second mouth 437 of the base 416 are substantially the same size and shape. In some examples, the third face 436 and the first face 450 (FIG. 4B) abut when the end cap 428 is coupled to the base 416 of the head portion 410. In some examples where the first mouth 434 of the end cap 428 and the second mouth 437 of the base 416 are substantially the same size and shape, the first and second mouths 434, 437 abut and are flush, creating a smooth transition between the end cap 428 and the base 416. In some examples, the first end 418 is at least one inch from the second face 452 of end cap 428 when the end cap 428 is coupled to the base 416 of the head portion 410. In another example, the first end 418 is at least two inches from the second face 452 of the end cap 428 when the end cap 428 is coupled to the base 416 of the head portion 410. In another example, the first end 418 is at least three inches from the second face 452 of the end cap 428 when the end cap 428 is coupled to the base 416 of the head portion 410. However, the above-mentioned distances are merely examples and, thus, other distances may be used without departing from the scope of this disclosure.

Figure 5A:
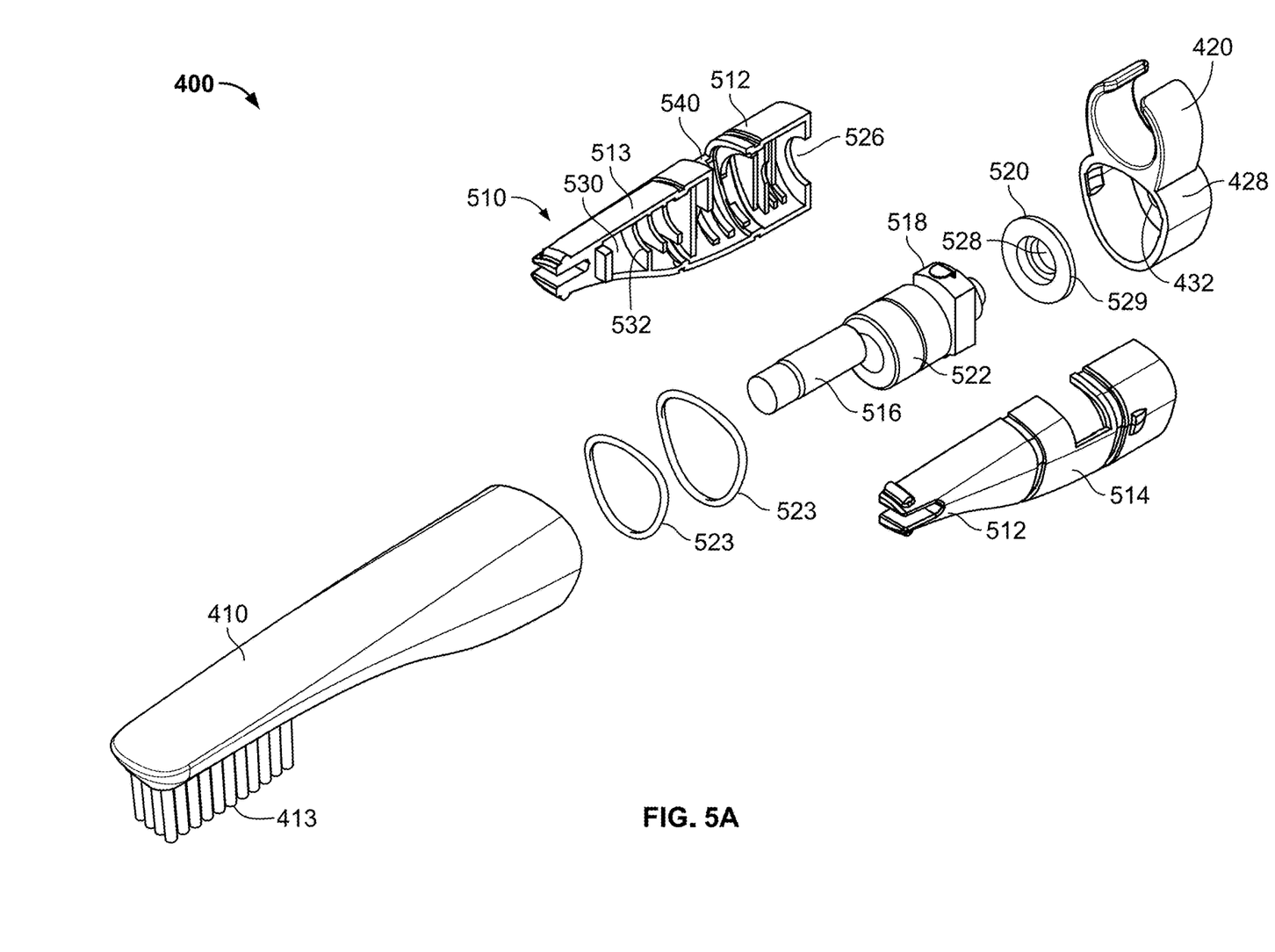
FIG. 5A is an exploded view of the electric toothbrush depicted in FIG. 4A.

FIG. 5A illustrates an exploded view of the electric toothbrush 400 of FIGS. 4A-4C. The electric toothbrush 400 includes a vibrator 510. The vibrator 510 includes a housing 512, a motor 516, a switch 518, and a switch button 520. In some examples, the switch 518 includes a switch button 520.

In some examples, the housing 512 is sized and dimensioned to fit around and/or receive the motor 516, battery 522, switch 518, and at least a portion of the switch button 520. In some examples, the motor 516 is received entirely within the housing 512. In some examples, the switch 518 is received entirely within the housing 512. In other examples, a portion of the switch 518 is received in the housing 512 such that another portion of the switch 518 is disposed exterior of the housing 512. In some examples, the battery 522 may be a replaceable (e.g., button cell) battery, a rechargeable and removable battery, or a rechargeable battery that is built into the vibrator 510 and charged with a charger (not shown). In some examples the battery 522 is received in the housing 512 but remains accessible such that it can be removed and/or replaced. In other examples, the battery 522 is received entirely within the housing 512 and includes an electrical connection (not shown) accessible from the exterior of the housing 512 for charging the battery 522. In some such examples, the electrical connection accessible from the exterior of the housing 512 operably couples (e.g., electrically couples) the battery 522 to, for example, a charging station and/or power cord that charges the battery 522. In the illustrated example, a first portion 529 of the switch button 520 is received in the housing 512, and a second portion 528 of the switch button 520 is disposed exterior of the housing 512 to enable the second portion 528 of the switch button 520 to extend through the aperture 432 of the end cap 428 to be accessible to a user.

Figure 5B:
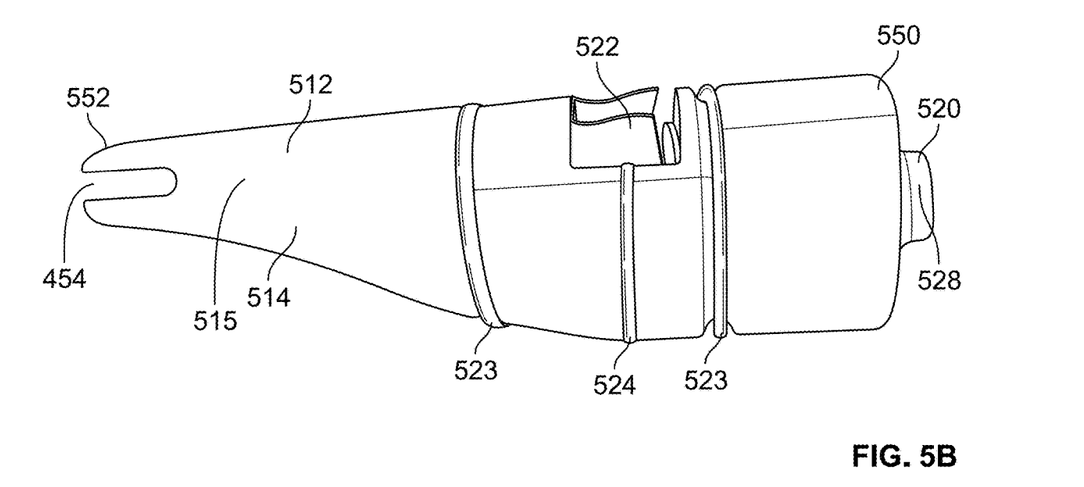
FIG. 5B is a side view of an example vibration mechanism of the electric toothbrush depicted in FIG. 5A.

The housing 512 of FIGS. 5A-5B includes a first casing 513 and a second casing 514. In the illustrated example, the first casing 513 is releasable coupled to the second casing 514. In some such examples, the first and second casings 513, 514 are releasably coupled via one or more bands 523 that surround the casings 513, 514 and urge the first casing 513 toward the second casing 514 and/or urge the second casing 514 toward the first casing 513. In other examples, the casings 513, 514 are removably coupled in one or more additional and/or alternative ways (e.g., via one or more clips, fasteners, etc.). In other examples, the first and second casings 513, 514 are formed as a single structure.

When the first casing 513 is coupled to the second casing 514, the motor 516, the battery 522, the switch 518, and/or the switch button 520 are clamped between the first casing 513 and the second casing 514 to non-movably couple the motor 516, the battery 522, the switch 518, and/or the switch button 520 to the housing 512. For example, in the illustrated example, the interior 530 of the first casing 513 and the interior (not shown) of the second casing 514 include a plurality of ribs 532. The ribs 532 are shaped and dimensioned to substantially conform to the shapes of the motor 516, the battery 522, the switch 518, and/or the switch button 520 to enable the motor 516, the battery 522, the switch, 518, and/or the switch button 520 to mate with the first casing 513 and the second casing 514 and, thus, seat the motor 516, the battery 522, the switch 518, and/or the switch button 520 in the housing 512 with minimal or substantially no play. As a result, vibrations of the motor 516 are transferred substantially directly to the housing 512. In some examples, the housing 512 is friction or press fit within the head portion 410 and the end cap 428 to facilitate transferring vibrations of the motor 516 to the brush of bristles 413 via the housing 512. Thus, in some such examples, vibrations from the motor 516 are transferred to the brush of bristles 513 via the housing 512 and the head portion 510 while preventing unwanted rattling when the motor 516 vibrates the housing 512.

The housing 512 includes a first end 552 and a second end 550 (FIG. 5B). In some examples, the motor 516 is disposed next to the first end 552 of the housing 512. In some examples, the battery 522 is disposed next to the motor 516 and is operably coupled (e.g., electrically coupled) to the motor 516. In some examples, the switch 518 is disposed next to the battery 522 such that the battery 522 is disposed between the switch 518 and the motor 516. The switch 518 is operably coupled (e.g., electrically coupled) to the battery 522 and/or the motor 516 to enable actuation of the switch 518 to turn the motor 516 on or off. At least a portion of the switch button 520 is disposed between the switch 518 and the second end of the housing. The switch button 520 is operably coupled to the switch 518 (e.g., mechanically coupled to the switch 518) to enable actuation of the switch button 520 to actuate the switch 518.

In the illustrated example, the first casing 513 and the second casing 514 are mirror images of each other. Therefore, descriptions of the first casing 513 are applicable to the second casing 514. Therefore, to avoid redundancy, certain descriptions of the second casing 514 are not separately described herein. The interiors 530 of the first casing 513 and the second casing 514 cooperate to define a port 540 in which the battery 522 is received. In some examples, the port 540 may be a space or gap between two or more of the ribs 532. The first casing 513 and the second casing 514 define an aperture 526 extending through the second end 550 of the housing 512. In some examples, a portion of the switch 518 protrudes through the aperture 526, and thus, is disposed exterior of the housing 512 to facilitate actuation of the switch 518. In some examples, the switch button 520 covers a portion of the switch 518 to form a liquid seal between the housing 512, the switch 518, and the aperture 526. In some such examples, the switch button 520 is rubberized. The aperture 526 in the housing 512 is aligned with the aperture 432 in the end cap 428 when the end cap 428 is coupled to the housing 512. Therefore, a portion of the switch 518 and/or switch button 520 that protrudes from the housing 512 (i.e., protrudes through the aperture 526 in the housing 512) also protrudes through the aperture 432 in the end cap 428 when the end cap 428 is coupled to the housing 512.

FIG. 5B illustrates a side view of the housing 512. In some examples, the housing 512 includes a ridge 524. The ridge 524 is located on an exterior surface 515 of the housing 512 and extends circumferentially around the housing 512. In some examples, the ridge 524 extends entirely around the housing 512. In other examples, the ridge 524 extends around only a portion of the housing 512. In some examples, the ridge 524 couples (e.g., by friction fit) to the notch 438 on the interior surface 439 of the base 416 to releasably couple the vibrator 510 to the head portion 410. In the illustrated example, the housing 512 includes a clasp 454 at the first end 552 of the housing 512. The clasp 454 of the housing 512 releasably couples to a prong 440 in the first cavity 417 of the head portion 410 to releasably couple the vibrator 510 to the head portion 410. In some examples, the first end 552 of the housing 512 is sized and shaped to fit into and/or be received by the first cavity 417 such that at least the entire portion of the housing 512 extending from first end 552 to the ridge 524 is disposed within the first cavity 417. In some examples, when the vibrator 510 is coupled to the head portion 410 (e.g., via the notch 438 and ridge 524), at least a portion of the second end 550 of the housing 512 is not disposed within the first cavity 417. In such an example, the end cap 428 couples to the second end 550 of the housing 510, for example, by friction fit. In some examples, no portion of the end cap 428 is disposed within the head portion 410.

In some examples, the end cap 428, the vibrator 510, and the head portion 410 are separate pieces and the end cap 428 is not directly coupled to the head portion 410. In some such examples, the head portion 410 is directly coupled to the vibrator 510, and the end cap 428 is directly coupled to the vibrator 510. For example, the first end 552 of the housing 512 may be disposed within the first cavity 417 of the head portion 410 such that the ridge 524 is directly coupled to the notch 438. The second end 550 of the housing 512 may be disposed within the second cavity 430 of the end cap 428 and directly coupled to the second cavity 430 of the end cap 428. Thus, in some examples, the entire vibrator 510 is disposed within a combination of the second cavity 430 and first cavity 417 when the head portion 410 and end cap 428 are coupled to the vibrator 510. In other examples, the entirety of the vibrator 510 fits within the first cavity 417 of the head portion 410. In some such examples, the end cap 428 may couple to a portion of the head portion 410 (i.e., the end cap 428 directly couples to the head portion 410). In other examples, the vibrator 510 is coupled to the head portion 410 and/or end cap 428 such that the vibrator 510, head portion 410, and end cap 428 are releasably coupled to one another such that they can be de-coupled by hand (e.g., without the necessary use of tools, such as a screwdriver). In some examples, the entirety of the vibrator 510 fits within the second cavity 430 of the end cap 428.

Figure 6:
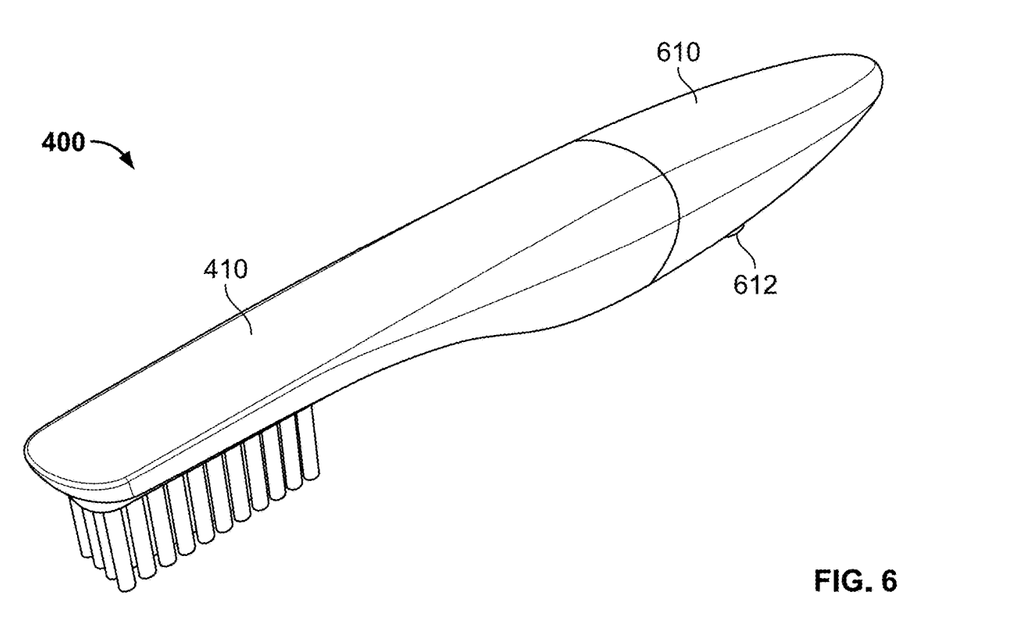
FIG. 6 is a perspective view of another example electric toothbrush in accordance with the teachings of the present disclosure.

FIG. 6 is a perspective view of the example of electric toothbrush 400 where the end cap 428 is a handle 610. Thus, the electric toothbrush 400 of FIG. 6 does not include the finger receptacle 420. The handle 610 couples to the head portion 410 and/or vibrator 510 (FIGS. 5A-5B), for example, by friction fit. The handle 610 enables a user to grip the electric toothbrush 400 in a manner similar to conventional toothbrushes, rather than coupling the electric toothbrush 400 to a finger, as discussed in FIGS. 4A-5B. The handle 610 includes a button 612, which may be coupled to a hammer (not shown) where, when the button 612 is pressed, the hammer actuates the switch 518 and/or switch button 520, turning the motor 516 on or off. The example electric toothbrush 400 may thus employ either the finger receptacle 420 or the handle 610, providing more versatility by enabling the electric toothbrush 400 to be suitable as an "on-the-go" toothbrush with the finger receptacle 420 or an "at-home" toothbrush with the handle 610.

While the disclosure has been illustrated and described in detail in the drawings and foregoing description, the same is to be considered as illustrative and not restrictive in character, it being understood that only certain examples have been shown and described and that all changes and modifications that come within the spirit of the disclosure are desired to be protected.

What is claimed is:

1. An electric toothbrush comprising:
   a head portion comprising a brush at a distal end and a cavity within the head portion having an opening at a proximal end of the head portion;
   an end cap having a finger receptacle disposed thereon; and
   a vibrator configured to be disposed within the cavity of the head portion;
   wherein the end cap is configured for attachment to the proximal end of the head portion.

2. The electric toothbrush of claim 1, wherein the vibrator comprises a housing, a motor, a battery, the housing having a distal end and a proximal end, wherein the housing comprises a ridge on an exterior surface structured to couple by friction fit to a notch on an interior surface of the cavity to releasably couple the vibrator to the head portion.

3. The electric toothbrush of claim 2, wherein the motor is positioned at the distal end of the housing so that when the housing is inside the cavity of the head portion the motor vibrations are concentrated at the distal end of the head portion.

4. The electric toothbrush of claim 2, wherein the motor is selected from at least an eccentric rotating mass vibration motor (ERM) and a linear resonant actuator (LRA).

5. The electric toothbrush of claim 2, wherein the housing comprises a first casing and a second casing, the first casing is structured to couple to the second casing, wherein the battery and the motor are clamped between the first casing and the second casing.

6. The electric toothbrush of claim 5, wherein the first casing and the second casing each comprise an interior portion, wherein the interior portion comprises a plurality of ribs shaped and dimensioned to substantially conform to the shape of the motor and the battery.

7. The electric toothbrush of claim 1, wherein the finger receptacle comprises a first prong, a second prong, and a base, wherein the first prong and the second prong extend from the base in a direction away from the brush such that the finger receptacle is positioned on a surface of the end cap away from the brush.

8. The electric toothbrush of claim 1, wherein the brush is removably coupled to the head portion.

9. The electric toothbrush of claim 1, wherein the head portion has a length of from about 1 inch to about 5 inches.

10. The electric toothbrush of claim 1, wherein the head portion has a length of from about 2 inches to about 4 inches.

11. An electric toothbrush comprising:
- a head portion comprising a brush at a distal end and a cavity within the head portion having an opening at a proximal end of the head portion;
- a handle; and
- a vibrator comprising a housing, a motor, a battery, a distal end and a proximal end;
- wherein the vibrator is contained within the cavity of the head portion and is positioned such that the distal end of the vibrator is proximate to the distal end of the head portion;
- wherein the handle is attached to the proximal end of the head portion enclosing the cavity, and
- wherein the housing comprises a first casing and a second casing, the first casing is structured to couple to the second casing and wherein the first casing and the second casing each comprise an interior portion, wherein the interior portion comprises a plurality of ribs shaped and dimensioned to substantially conform to the shape of the motor and the battery.

12. The electric toothbrush of claim 11, wherein the housing comprises a ridge on an exterior surface structured to couple by friction fit to a notch on an interior surface of the cavity of the head portion to releasably couple the vibrator to the head portion.

13. The electric toothbrush of claim 11, wherein the motor is positioned at the distal end of the housing such that motor vibrations are concentrated at the distal end of the head portion.

14. The electric toothbrush of claim 11, wherein the motor is selected from at least an eccentric rotating mass vibration motor (ERM) and a linear resonant actuator (LRA).

15. The electric toothbrush of claim 11, wherein the brush is removably coupled to the head portion so that the brush can be replaced without having to replace the head portion.

16. The electric toothbrush of claim 11, wherein the battery and the motor are clamped between the first casing and the second casing.

17. The electric toothbrush of claim 11, wherein the head portion has a length of from about 1 inch to about 5 inches.

18. The electric toothbrush of claim 11, wherein the head portion has a length of from about 2 inches to about 4 inches.

* * * * *